United States Patent [19]

Yamaguchi et al.

[11] Patent Number: 5,753,322
[45] Date of Patent: May 19, 1998

[54] ANTIBACTERIAL, ANTIFUNGAL ALUMINUM BUILDING MATERIALS AND FIXTURES USING THE MATERIALS

[75] Inventors: Tadashi Yamaguchi; Hideo Fukui. both of Sendai; Masayuki Kobayashi. Miyagi-ken; Nobuyuki Nakada. Kurobe; Toshio Arai. Toyama. all of Japan

[73] Assignee: YKK Corporation. Tokyo, Japan

[21] Appl. No.: 634,985

[22] Filed: Apr. 19, 1996

[30] Foreign Application Priority Data

Apr. 21, 1995 [JP] Japan .................. 7-119063
May 10, 1995 [JP] Japan .................. 7-135728

[51] Int. Cl.$^6$ .................. A47G 1/12
[52] U.S. Cl. .................. 428/14; 428/457; 428/469; 428/901; 428/907
[58] Field of Search .................. 428/14, 457, 469, 428/901, 907

[56] References Cited

U.S. PATENT DOCUMENTS

| 4,154,876 | 5/1979 | Segawa et al. | 428/421 X |
| 4,220,675 | 9/1980 | Imazaki | 428/463 X |
| 4,804,709 | 2/1989 | Takago et al. | 528/17 X |
| 5,147,686 | 9/1992 | Ichimura et al. | 427/217 |
| 5,496,652 | 3/1996 | Sasaki et al. | 428/659 X |
| 5,578,669 | 11/1996 | Odawa et al. | 524/414 |
| 5,593,737 | 1/1997 | Meinzer et al. | 427/512 |

FOREIGN PATENT DOCUMENTS

| A-2-6333 | 1/1990 | Japan . |
| A-4-307066 | 10/1992 | Japan . |
| A-6-65012 | 3/1994 | Japan . |

Primary Examiner—Henry F. Epstein
Attorney, Agent, or Firm—Sughrue, Mion, Zinn, Macpeak & Seas, PLLC

[57] ABSTRACT

Disclosed is an aluminum building material which comprises a substrate made of aluminum or an aluminum alloy, an anodic oxide film formed on the surface of the substrate, and a thin film containing a photocatalytically active semiconductor and deposited on the anodic oxide film. The film containing the photocatalytically active semiconductor embraces both a film formed solely of the semiconductor mentioned above and a film having fine particles of the semiconductor incorporated in or deposited on a suitable carrier such as, for example, a coating film. A fixture unit is also provided which comprises a frame member made of the aluminum building material mentioned above, a panel member having the surface thereof coated with a film containing a photocatalytically active semiconductor, and a watertight and airtight member containing fine particles of a photocatalytically active semiconductor.

29 Claims, 5 Drawing Sheets

ANTIBACTERIAL, ANTIFUNGAL ALUMINUM BUILDING MATERIALS AND FIXTURES USING THE MATERIALS

BACKGROUND OF THE INVENTION

1. Field of the Invention

This invention relates to a building material made of antibacterial and antifungal aluminum or aluminum alloy (hereinafter referred to as "aluminum building material") and a fixture using the aluminum building material.

2. Description of the Prior Art

In recent years, the in-hospital infections caused by MRSA (methicillin-resistant Staphylococcus aureus) or the like have come to arouse grave concern. Most in-hospital infections develop into opportunistic infectious diseases which manifest their symptoms when the relevant viruses, bacteria, protozoans, and fungi suddenly start up activity within patient bodies when the patients have their resisting power and immunity lowered. As concerns the infection by MRSA, for example, though the bacteria seem to disseminate within the building of hospital chiefly through the medium of the bodies of patients and hospital employees, the slippers worn by them, and the medical devices, they possibly adhere to dust particles suspended in the air and induce aerial infections.

The prevention of these in-hospital infections, therefore, requires the whole indoor air of a hospital building to be sterilized and purged. The fulfillment of this requirement has heretofore relied on chemical disinfection or use of an air cleaner. In the disinfection, however, the chemical agents used therefor are at a disadvantage in exerting an influence incapable of complete disregard on human bodies and emitting an offensive odor. Moreover, the disinfection cannot be performed frequently as because of a difficult work involved therein. Though the purging of the indoor air by means of an air cleaner is relatively easy to accomplish, the air cleaner which operates on the principle of removing the dust particles in the air by virtue of static electricity is at a disadvantage in incurring difficulty in removing bacteria, fungi, and the odors attendant thereof.

Apart from the above problems, the tars in tobacco smoke, when suffered to adhere to and stain the surfaces of building materials such as sashes and panels, have the problem that they not only impair good appearance of the building materials but also entail deposition and growth of bacteria in the stained parts.

It has been known long to date that fine particles of such semiconductors as $TiO_2$ which are possessed of a photocatalytic action have antibacterial, antifungal, antifouling and deodorizing effects. Recently, researches are being continued for the development of various materials which are adapted to render growth of bacteria and fungi difficult by the use of these semiconductor particles. Published Japanese Patent Application, KOKAI (Early Publication) No. (hereinafter referred to briefly as "JP-A-") 02-6,333, for example, discloses an antibacterial powder having an antibacterial metal such as copper or zinc deposited on the surface of titanium dioxide particles. This disclosure suggests the possibility that the incorporation of this powder in resins, rubber, glass, etc. will permit production of antibacterial compositions and the powder will be utilized not only for the antibacterial treatment of electric devices, household furniture and fixtures, interior decorative materials, and food packaging materials but also as antibacterial agents for sanitary facilities and devices.

JP-A-06-65,012 has a disclosure to the effect that when a substrate made of such a material as concrete, glass, plastic, ceramic, or metal is coated with a film of titanium dioxide containing such a metal as silver, copper, zinc, or platinum, it can be prevented from suffering growth of bacteria and fungi thereon.

JP-A-04-307,066 discloses a method for photocatalytically refreshing an indoor air by attaching a photocatalyst to the rear surface of a panel, disposing a very-high-frequency lamp on the rear side of the panel, and causing the lamp to irradiate the photocatalyst with ultraviolet radiation thereby activating the photocatalyst and deodorizing the indoor air of the room in which the panel is installed.

The deodorizing panel mechanism disclosed in JP-A-04-307,066 which is aimed at deodorizing the interior of a room, however, necessitates installation of an ultraviolet lamp as described above. When such a special light source as mentioned above is used, the disadvantage ensues that the light source calls for the trouble of maintenance and entails a running cost such as of electric charge. The indoor installation of an ultraviolet lamp is dangerous and also capable of inducing interior fixtures and furniture to discolor.

When building materials such as, for example, panels which are made of aluminum or an aluminum alloy (hereinafter referred to as "aluminum alloy") are coated with a photocatalyst such as titanium dioxide, since no ample adhesion is secured between the substrate of aluminum alloy and the photocatalyst, the problem ensues that the applied film of the photocatalyst readily peels off the substrate.

SUMMARY OF THE INVENTION

An object of the present invention, therefore, is to provide an antibacterial and antifungal aluminum building material which has the surface of an aluminum alloy substrate coated with an antibacterial and antifungal film with high adhesion strength and which fulfills the function as aimed at without requiring any special device and obviates the necessity for maintenance.

Another object of the present invention is to provide a fixture unit which is capable of self-purification and also capable of precluding growth of bacteria and fungi and refining the indoor air without necessitating use of such a special device as an air cleaner or disinfecting operation with a chemical agent.

To accomplish the objects described above, in accordance with one aspect of the present invention, there is provided an aluminum building material which comprises a substrate made of aluminum alloy, an anodic oxide film formed on the surface of the substrate, and a thin film containing a photocatalytically active semiconductor and deposited on the anodic oxide film. The term "film containing a photocatalytically active semiconductor (hereinafter referred to as "photocatalytic film")" as used herein embraces both a film formed of the semiconductor mentioned above (hereinafter referred to as "semiconductor film") and a film having fine particles of the semiconductor incorporated in or deposited on a suitable carrier such as, for example, a coating film.

In a preferred embodiment, the present invention provides a more eminently excellent antibacterial and antifungal building material by coating the photocatalytic film mentioned above further with such an antibacterial metal as silver or copper or by coating the anodic oxide film with a coating film having incorporated therein or deposited thereon fine particles of such an antibacterial metal as silver or copper in combination with fine particles of the photocatalytically active semiconductor mentioned above.

In another embodiment, the present invention provides an aluminum building material wherein the photocatalytic film mentioned above comprises a coating film of two-layer structure composed of a coating layer not incorporating therein fine particles of a photocatalytically active semiconductor and a coating layer formed on the former coating layer and incorporating therein the fine particles of a semiconductor mentioned above alone or in combination with fine particles of an antibacterial metal.

In accordance with another aspect of the present invention, there is provided a fixture unit which uses such an aluminum building material as mentioned above. In one embodiment, this aspect of the invention provides a fixture unit which comprises a frame member or rail-and-stile comprising a substrate of aluminum alloy, an anodic oxide film formed on the surface of the substrate, and a photocatalytic film deposited on the anodic oxide film, a panel member having the surface thereof coated with a photocatalytic film, and a watertight and airtight member or sealant containing fine particles of a photocatalytically active semiconductor. In a preferred embodiment of the fixture unit mentioned above, the panel member is formed of a panel member for a window glass.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1A:
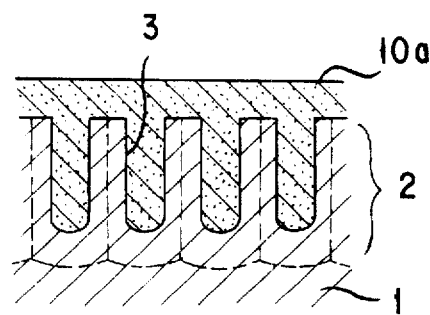
FIGS. 1A through 1D are enlarged fragmentary cross sectional views schematically showing various examples of the mode of coating an anodic oxide film formed on the surface of a substrate of aluminum alloy with a photocatalytic film.

When a ground metal of aluminum alloy is directly coated with a photocatalytic film, the disadvantage arises that the photocatalytic film will peel off the ground metal on exposure to an external impact because of inferior adhesion between the photocatalytic film and the ground metal of aluminum alloy.

For the solution of this problem, a film which is capable of manifesting an anchoring effect for reinforcing the adhesion between the photocatalytic film and the ground metal of aluminum alloy should be interposed between the photocatalytic film and the ground metal of aluminum alloy. As the intervening film of this quality, the aluminum building material of the present invention uses a microporous anodic oxide film integrally formed on the surface of aluminum alloy.

Specifically, the aluminum building material of the present invention is produced by forming an anodic oxide film on the surface of a substrate made of aluminum alloy and further applying a photocatalytic film as a coating to the anodic oxide film. The anodic oxide film is an insulating film and has in the surface thereof a microporous texture full of countless micropores of diameters in the approximate range of 5 nm to 250 nm and an undulating contour. As a result, the anchoring effect of the microporous structure serves to enhance the adhesion of the photocatalytic film as a coating to the ground metal of aluminum alloy.

The aluminum building material of the present invention avoids such a problem as separation of the photocatalytic film and exhibits an excellent antibacterial and antifungal effects because it has the photocatalytic film deposited on the microporous anodic oxide film which is possessed of an anchoring effect capable of enhancing the adhesion between the photocatalytic film and the ground metal of aluminum alloy as described above.

This building material has fine particles of a photocatalytically active semiconductor such as, for example, $TiO_2$ distributed in an ample amount in the surface part thereof. The $TiO_2$ surface generates positive holes ($h^+$) and excited electrons ($e^-$) and consequently manifests a photocatalytic action when the fine particles of the semiconductor are exposed to the radiation of the sunlight or a fluorescent lamp. Specifically, by the action of these electrons, the oxygen in the air is reduced and then disposed to produce oxygen radicals. By the action of positive holes, water is oxidized to produce OH radicals. Since the active oxygen thereof is possessed of an excellent germicidal action, it renders difficult the growth of fungi on this building material.

Still another embodiment of the present invention provides an aluminum building material which, by using a coating film as a carrier for the fine particles of a photocatalytically active semiconductor and utilizing an ordinary coating technique for aluminum building material, is enabled to attain highly strong adhesion thereto of an antibacterial and antifungal film as a coating.

Such popular practices as a method which comprises preparing a suspension of fine particles of a photocatalyst, applying the suspension to the surface of a substrate, and sintering the applied layer of the suspension and a method which comprises first forming a thin metal film and subsequently oxidizing this thin film thereby forming a prescribed photocatalytic film require relevant treatments to be carried out at temperatures exceeding 200° C. When an aluminum alloy is exposed to such a high temperature as mentioned above, it will incur the problem of conspicuously losing strength. When a photocatalytic film is applied as a coating to an extruded profile having a complicated shape, the coating has a problem of difficulty in applying the photocatalytic film uniformly even to depressing parts and corners because of poor throwing power.

For the solution of this problem, the aluminum building material according to the preceding embodiment of the present invention is produced by forming an anodic oxide film on the surface of a substrate made of aluminum alloy and applying to the anodic oxide film a coating film incorporating therein or carrying thereon fine particles of a photocatalytically active semiconductor in such a manner that at least part of the fine particles are partially exposed to the ambience through the surface of the coating film. This embodiment obviates the necessity of carrying out such a treatment at a temperature exceeding 200° C. as is needed by the conventional photocatalytic film and precludes a decrease of strength of the substrate of aluminum alloy because it causes the coating film incorporating therein or carrying thereon the fine particles of a photocatalytically active semiconductor to be applied as a coating to the anodic oxide film by utilizing an ordinary coating technique for aluminum building material. Further, it permits the antibacterial and antifungal film to be applied as a coating uniformly with high adhesive strength, easily, and with good working efficiency to aluminum building materials of varying shapes ranging from panel members to extruded profiles of complicated shapes.

The thickness of the anodic oxide film to be formed on the surface of aluminum alloy is advantageously in the range of 0.001 to 30 µm. If the thickness of the film is less than 0.001 µm, this film will be unable to manifest the anchoring effect amply to the photocatalytic film to be deposited thereon. Conversely, if this thickness exceeds 30 µm, the anodic oxide film will possibly peel off the ground metal of aluminum alloy at the moment that it is exposed to an external impact.

The treatment of anodic oxidation can be attained by the well-known method using an electrolytic solution formed of an inorganic acid such as sulfuric acid, chromic acid, or phosphoric acid, an organic acid such as oxalic acid, sulfosalicylic acid, or malonic acid, or a mixture thereof. The present invention does not particularly discriminate the treatment of anodic oxidation on account of the kind of electrolytic solution so long as the treatment is capable of forming an anodic oxide film possessed of micropores.

The semiconductor to be effectively used in the present invention is only required to possess a relatively large mobility of electrons and of positive holes and exhibit such a photocatalytic action as mentioned above. As concrete examples of the semiconductor, $TiO_2$, $SrTiO_3$, $ZnO$, $CdS$, $SnO_2$, $RuO_2$, $Cs_3Sb$, $InAs$, $InSb$, and $GaAs$ may be cited. Among other semi-conductors mentioned above, $TiO_2$ proves particularly proper.

This photocatalytically active semiconductor can be applied as a coating by any of the various known methods such as, for example, sputtering process, thermal spraying method, laser abrasion method, sol-gel method, and plating method. Further, the use of a coating film as a carrier for the fine particles of a photocatalytically active semiconductor can be fulfilled by means of the coating method. By this method, the photocatalytic film can be applied as a coating to the anodic oxide film on the surface of aluminum alloy and this photocatalytic film can be formed with very high adhesive strength because part of the photocatalytic film are deposited in the micropores of the anodic oxide film or the micropores of the anodic oxide film are sealed with the photocatalytic film.

Figure 1B:
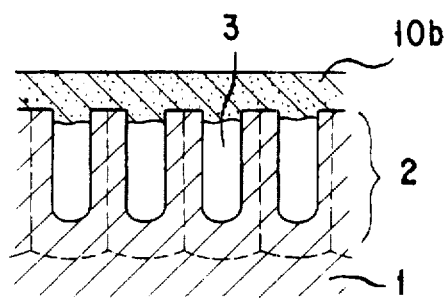
Figure 1C:
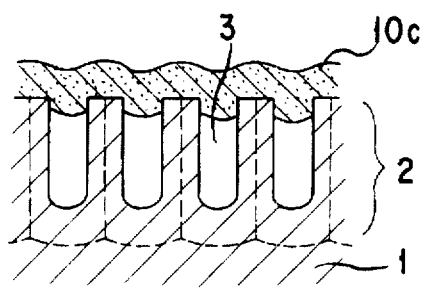
Figure 1D:
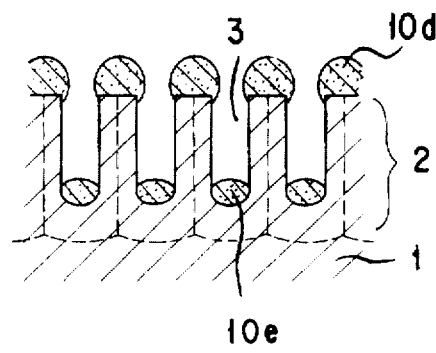
Figure 2:
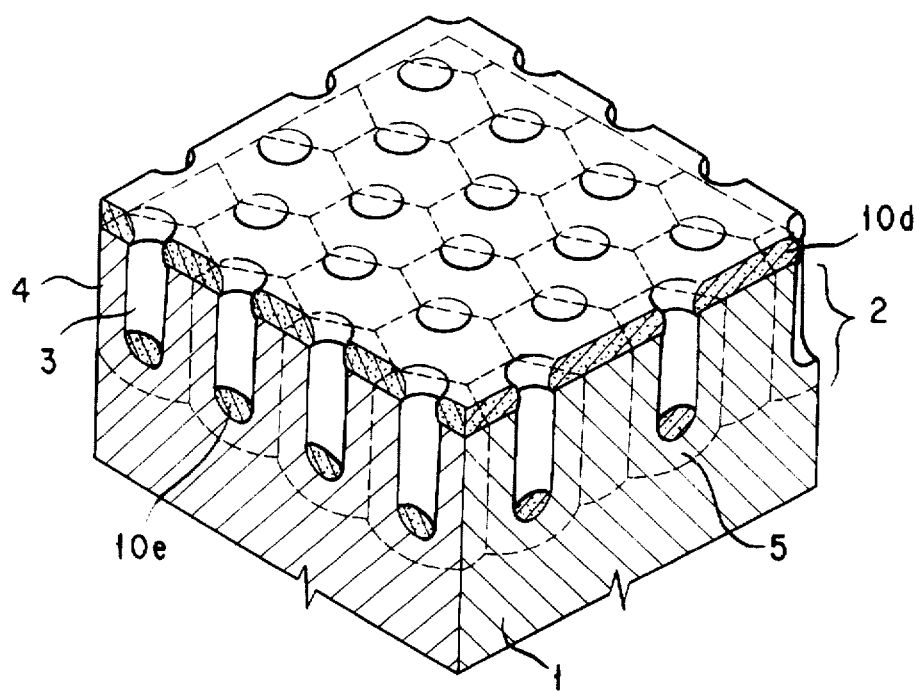
FIG. 2 is a fragmentary sectioned perspective view schematically showing the mode of coating an anodic oxide film with a photocatalytic film of FIG. 1D.

Several examples of the mode of applying the photocatalytic film as a coating to the anodic oxide film are shown in FIG. 1A through FIG. 8. As shown in FIG. 2, an anodic oxide film 2 formed on the surface of a ground metal of aluminum alloy 1 is in aggregate of hexagonally columnar cells 4. A pore 3 is formed perpendicularly to the ground metal of aluminum alloy 1 in the center of each cell 4. A generally bowl-shaped barrier layer 5 is formed contiguously to the ground metal of aluminum alloy 1 in the bottom part of the pore 3.

When a semiconductor film intended as the photocatalytic film is applied in the form of a coating to the anodic oxide film of such a structure as described above, coating films of varying patterns as shown in FIG. 1A through FIG. 1D are obtained, depending on the method of coating or the diameter of fine particles of the semiconductor to be applied. FIG. 1A shows a pattern in which fine particles of the semiconductor are deposited fully inside the pores 3 of the anodic oxide film 2 and, at the same time, applied in the form of a film to the surface of the anodic oxide film 2 and the pores 3 of the anodic oxide film 2 are sealed with a semiconductor film 10a applied as described above. FIG. 1B and FIG. 1C show a pattern in which semiconductor films 10b and 10c are deposited substantially on the anodic oxide film 2 in such a manner as to occlude the pores 3 while being allowed to enter partly the pores 3 of the anodic oxide film 2; FIG. 1B depicting the semiconductor film 10b with a flat smooth surface and FIG. 1C depicting the semiconductor film 10c with an undulating surface.

In contrast, FIG. 1D and FIG. 2 show a pattern in which fine particles 10e of a semiconductor are deposited in the bottom parts of the pores 3 of the anodic oxide film 2 and, at the same time, on the surface of the anodic oxide film 2 without being allowed to occlude completely the pores and a porous semiconductor film 10d is applied as a coating to the anodic oxide film 2. The coating of this pattern is liable to occur particularly when the sputtering process is used. Specifically, the cell walls in the anodic oxide film function as a barrier against sputtered particles which fly in all the directions toward the pores so that the amount of sputtered particles suffered to deposit within the pores is small. Conversely, the sputtered particles are deposited selectively on the top parts of the cell walls of the anodic oxide film 2 and, as a result, the coating film in such a porous structure as shown in FIG. 1D and FIG. 2 is obtained.

The thickness of the semiconductor film deposited on the anodic oxide film formed on the aluminum alloy substrate is appropriately in the range of several nm to 1 µm. Though the photocatalytic action is exalted and, as a consequence, the antibacterial and antifungal properties are improved in proportion as the film thickness is increased, an increase of the film thickness beyond 1 µm will be undesirable because the excess thickness goes to render the film easily separable from the surface of the substrate. This film separation is liable to occur particularly when the building material to which the semiconductor film has been applied as a coating is bored, cut, and variously machined or when it is fabricated. Conversely, as the thickness of the film is decreased, so the photocatalytic action is reduced and the antibacterial and antifungal properties are precluded from being fully manifested. Thus, the desirable film thickness is not less than several nm, preferably not less than 10 nm.

Further, the present invention provides an aluminum building material which enjoys a still better antibacterial and antifungal effect by depositing the photocatalytic film on the anodic oxide film forming the surface of the aluminum alloy substrate as described above and then further depositing such an antibacterially or antimicrobially active metal as Ag or Cu thereon. This aluminum building material retains the antibacterial or antimicrobial property at night even after the fluorescent lamp stops glowing. Thus, it serves to keep the entire indoor space in a hygienic state at all times.

The application of the antibacterial metal as a coating, similarly to that of the semiconductor film as described above, can be attained by various methods such as, for example, sputtering process, thermal spraying method, laser ablasion method, sol-gel method, and plating method.

The thickness of the film of the antibacterial metal produced consequently should be not more than 1 µm. The film of this antibacterial metal, similarly to the film of the semiconductor mentioned above, has the antibacterial action thereof enhanced in proportion as the thickness thereof is increased. If the thickness of this film exceeds 1 µm, however, the surface of the building material not only begins assuming a metallic color and ultimately poses a problem of impaired appearance but also intercepts the incident light and compels the underlying semiconductor film to suffer degradation of the antibacterial and antifungal action. The thickness of the film of the antibacterial metal, therefore, should be kept from exceeding 1 µm. It is preferably in the range of 1 to 100 nm, and more preferably in the range of 1 to 10 nm. This antibacterial metal is not always required to be attached in the form of a film to the surface of the semiconductor film but rather is preferably attached as dispersed in the form of islands in a sea in due consideration of the ease with which the incident light reaches the underlying semiconductor film.

The present invention further permits formation of a photocatalytically active antibacterial and antifungal coating film on the anodic oxide film surfacing the aluminum alloy substrate by such a coating method as electrodeposition coating method, electrostatic coating method, or the like. The substrate to be effectively coated in this case with the film under discussion may be in various shapes ranging from complicated contours to flat panels.

The electrodeposition coating or the electrostatic coating is a method which is popularly adopted for the surface treatment of building materials. Owing to the use of these methods, uniform application of the antibacterial and antifungal coating film to a blank building material even complicated in shape can be attained and, moreover, the antibacterial and antifungal coating film can be formed without requiring any alteration in the existing production facilities.

The coating material to be used herein may be any of the known coating materials such as, for example, acrylic resin coating materials, polyester resin coating materials, polyurethane resin coating materials, and fluorocarbon resin coating materials. It is subject to no particular restriction except for the requirement that it be capable of forming on the building material a coating film possessed of appropriate strength, adhesiveness, and resistance to photocatalytic action. It can be selected so as to suit the purpose for which the coating material is used.

For the formation of the photocatalytically active antibacterial and antifungal coating film using the coating material and the fine particles of a semiconductor, various methods are available.

When the coating material and the fine particles of the semiconductor mentioned above are mixed at a proper ratio and the resultant coating solution containing the particles of the coating material and the fine particles of the semiconductor is applied by the electrodeposition coating technique, for example, the coating material particles carrying the fine particles of the semiconductor are converted into anions and caused to adhere to the anodic oxide film on the surface of the building material. The subsequent steps of washing with water and baking of the coating film enable the building material to be vested on the surface thereof with a coating film containing fine particles of a photocatalytically active semiconductor.

When the aforementioned coating solution containing the particles of the coating material and the fine particles of the semiconductor is used in the electrostatic coating process, the coating material particles carrying the fine particles of the semiconductor are caused to assume microcharges and adhere to a substrate which is grounded. The subsequent baking treatment enables the building material to be vested on the surface thereof with a coating film containing fine particles of a photocatalytically active semiconductor.

Figure 3:
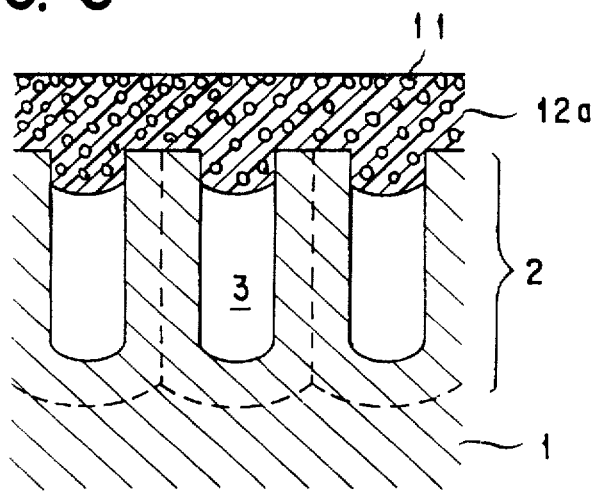
FIG. 3 is an enlarged fragmentary cross sectional view schematically showing the structure of an aluminum building material having an anodic oxide film coated with a coating film incorporating therein fine particles of a photocatalytically active semiconductor.

By the coating method described above is obtained an aluminum building material which has formed on the anodic oxide film 2 surfacing the ground metal of aluminum alloy 1 a coating film 12a having fine particles of a photocatalytically active semiconductor 11 mixed therein as shown in FIG. 3. Since part of the coating film 12a enters the pores 3 of the anodic oxide film 2, the aforementioned antibacterial and antifungal coating film 12a exhibits veritably excellent adhesive strength to the anodic oxide film 2.

For the formation of the antibacterial and antifungal coating film, another method is available which comprises applying a coating film not containing fine particles of a semiconductor to the anodic oxide film, for example, by the electrodeposition coating process or electrostatic spray coating process and, while the coating film is still in a soft state prior to the baking treatment, depositing the fine particles of a photocatalytically active semiconductor by spraying on the coating film.

Figure 4:
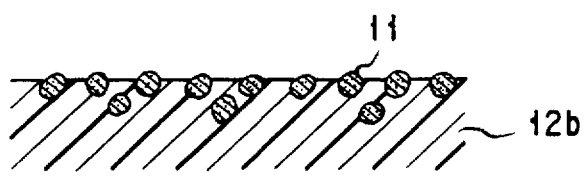
FIG. 4 is an enlarged fragmentary cross sectional view schematically showing the structure of a coating film having fine particles of a semiconductor embedded in the surface part thereof.

By the method described above, a coating film 12b which has the fine particles of semiconductor 11 deposited in the surface part thereof in such a manner that part of the fine particles of semiconductor 11 are embedded in the surface part of the coating film 12b is applied to the anodic oxide film (not shown) as shown in FIG. 4. This method enables the fine particles of semiconductor 11 to be relatively uniformly embedded exclusively in the surface part of the coating film 12b as shown in FIG. 4 by adjusting such factors as the pressure with which the fine particles of semiconductor are sprayed.

In order that the produced antibacterial and antifungal coating film may manifest a necessary photocatalytic action, the coating methods described above are invariably required to have at least part of the fine particles of a photocatalytically active semiconductor partially exposed through the surface of the coating film.

The quantitative proportion of the fine particles of semiconductor to be incorporated in or deposited on the coating film, therefore, is appropriately in the range of 0.01 to 100% by weight, based on the total amount of the coating film (weight of the coating material). If this proportion is less than 0.01% by weight, the amount of the fine particles of semiconductor destined to manifest photocatalytic properties will be insufficient and, as a consequence, the building material will fail to acquire a fully satisfactory antibacterial and antifungal properties. Conversely, if the proportion exceeds 100% by weight, the disadvantage arises that the coating film will lose adhesiveness conspicuously, though the antibacterial and antifungal properties are manifested infallibly. Particularly, in the case of the method which fulfills the application of a coating by the electrodeposition technique or the electrostatic coating technique using a coating solution incorporating therein the fine particles of semiconductor, since the quantitative proportion of the fine particles of semiconductor which are contained in the coating film and do not contribute to manifestation of photocatalytic properties is increased, the amount of the fine particles of the photocatalytically active semiconductor to be incorporated in the coating solution is appropriately in the range of from not less than 10% by weight to less than 100% by weight.

The diameter of the fine particles of semiconductor to be used is appropriately in the range of 1 nm to 1 μm, preferably in the range of 5 nm to 0.5 μm. If the particle diameter is smaller than 1 nm, the problem ensues that the band gap will be enlarged by the quantum size effect and the photocatalytic properties will not be obtained unless in the presence of light of a short wavelength emitted from a low-pressure mercury vapor lamp or the like. If the particle diameter is unduly small, the problem arises that the fine particles of semiconductor will allow no easy handling and they will manifest inferior dispersibility in the coating solution. From the viewpoint of the ease of handling, the particle diameter is appropriately not less than 5 nm. Conversely, if the particle diameter exceeds 1 μm, the ability of the coating film to carry the fine particles of semiconductor thereon will be degraded and the content of the fine particles of semiconductor in the coating film to be formed on the surface of the substrate will be unduly small. Further, if the particle diameter is large, the surface of the coating film will suffer ultimate presence of relatively large particles of semiconductor and consequently manifest inferior smoothness and the particles exposed through the surface will tend to fall off. With all these factors in view, the fine particles of semiconductor advantageously have a diameter of not more than 0.5 μm.

The thickness of the coating film is appropriately in the range of several μm to some tens of μm. Though the coating layer gains in weatherability in proportion as the film thickness increases, the increase in film thickness adds proportionately to the readiness with which the coating film peels off while the building material is being bored, cut, or otherwise machined or fabricated. This increase in the film thickness is uneconomical in respect that it brings about a proportional addition to the amount of the fine particles of semiconductor to be contained in the coating film. Appropriately, the thickness is not more than 50 μm, for example, and preferably not more than 30 μm.

Still another embodiment of the building material of the present invention is possessed of a coating film of a two-layer structure composed of a layer having the fine particles of the aforementioned photocatalytically active semiconductor incorporated in a coating film and a layer formed solely of a coating film. By producing the coating film in the two-layer structure, the amount of the fine particles of semiconductor to be contained can be decreased while the photocatalytic activity thereof is kept intact.

Figure 5:
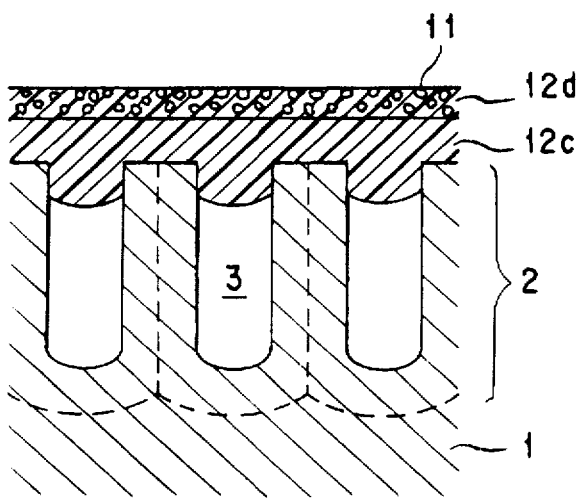
FIG. 5 is an enlarged fragmentary cross sectional view schematically showing the structure of an aluminum building material having an anodic oxide film coated with a coating film of a two-layer structure composed of an ordinary coating film and a coating film having fine particles of semiconductor incorporated therein.

A coating film forming a two-layer structure and having the fine particles of a photocatalytically active semiconductor contained in the surface layer is obtained by first coating a substrate with an ordinary coating material and then coating the first coat with a coating material solution having a suitable amount of the fine particles of a semiconductor incorporated in a coating material in accordance with the aforementioned coating method as a means to form a coating film of the two-layer structure. To be specific, the method described above produces an aluminum building material which, on an anodic oxide film 2 produced on the surface of a ground metal of aluminum alloy 1, forms a coating film of a two-layer structure composed of an ordinary coating film 12c constituting the under layer and incorporating no fine particle of semiconductor therein and a coating film 12d superposed on the coating film 12c and incorporating the fine particles of semiconductor 11 therein as shown in FIG. 5. In this embodiment, the coating film 12c manifests literally ideal adhesive strength to the anodic oxide film 2 because part of the coating film 12c of the under layer enters the pores 3 of the anodic oxide film 2.

Also in the embodiment described above, the amount of the fine particles of semiconductor to be incorporated in the surface layer is appropriately in the range of 0.01 to 100% by weight, preferably in the range of 10 to 100% by weight, based on the total amount of the coating film 12d of the surface layer for the same reason as remarked above with respect to the coating film of the one-layer structure mentioned above.

The coating material to be used in the surface layer and the coating material to be used for forming the under layer may be different in kind on the condition that they enable the produced two-layer structure to manifest ample adhesive strength. In due respect of the adhesive strength, however, it is preferable to use the coating materials of one and the same kind.

In the coating film of the two-layer structure, the thickness of the surface layer is appropriately in the range of 0.5 to 1 μm and that of the under layer on the substrate side in the range of several μm to some tens of μm for the same reason as remarked above with respect to the coating film of one-layer structure mentioned above.

For the building material of the present invention, two basic modes of a coating film having fine particles of a photocatalytically active semiconductor contained therein or deposited thereon have been described. For the building materials to acquire further enhanced antibacterial properties, the coating film may have contained therein or deposited thereon fine particles of such an antibacterial metal as copper, silver, or platinum besides the fine particles of the semiconductor mentioned above. Since these metals manifest the antibacterial properties even in the absence of radiation of light, the coating film which has the antibacterial metal contained therein or deposited thereon is capable of retaining the antibacterial and antifungal activity at night after the fluorescent lamp is turned off. The size and the shape of the fine particles of the antibacterial metal and the method of addition thereof to the coating film are the same as those of the fine particles of the photocatalytically active semiconductor mentioned previously. The content of these fine particles is appropriately such that the total amount of the fine particles of the antibacterial metal and the fine particles of the semiconductor which are contained simultaneously therewith may fall in the range of 0.01 to 100% by weight, preferably in the range of 10 to 100% by weight, based on the total amount of the coating film (weight of the coating material) to which these fine particles are to be contained therein or deposited thereon.

Examples of the structure of a coating film having the fine particles of the antibacterial metal and the fine particles of the photocatalytically active semiconductor contained simultaneously therein are shown in FIG. 6 through FIG. 9.

Figure 6:
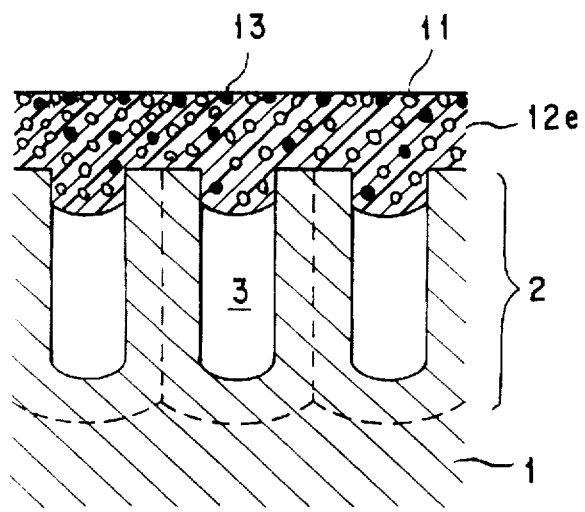
FIG. 6 is an enlarged fragmentary cross sectional view schematically showing an aluminum building material having an anodic oxide film coated with a coating film incorporating fine particles of a semiconductor and fine particles of an antibacterial metal therein.

FIG. 6 illustrates a structure in which a coating film 12e having the fine particles of the photocatalytically active semiconductor 11 and fine particles of an antibacterial metal 13 incorporated in a mixed state therein is applied to the anodic oxide film 2 produced on the surface of the ground metal of aluminum alloy 1.

Figure 7:
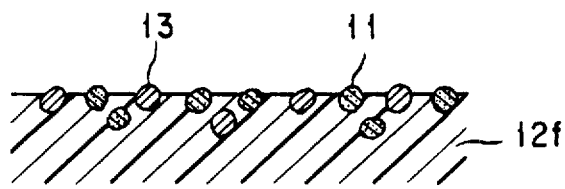
FIG. 7 is an enlarged fragmentary cross sectional view schematically showing the structure of a coating film having fine particles of a semiconductor and fine particles of an antibacterial metal embedded in the surface part thereof.

FIG. 7 illustrates a state in which the fine particles of the semiconductor 11 and the fine particles of the antibacterial metal 13 are both embedded in the surface part of a coating film 12f formed solely of a coating solution on the anodic oxide film after the fine particles 11, 13 have been blown against the coating film 12f.

Figure 8:
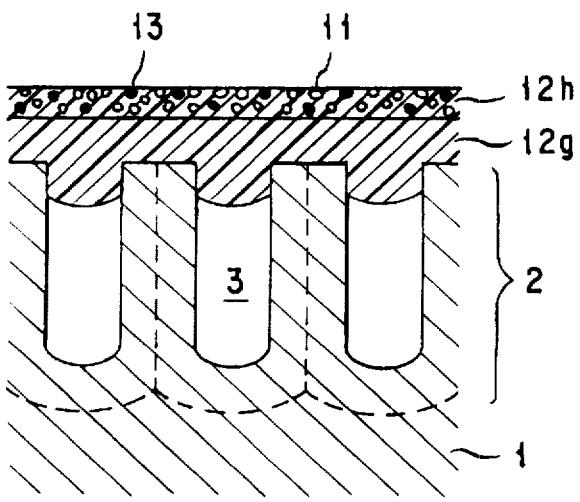
FIG. 8 is an enlarged fragmentary cross sectional view schematically showing the structure of an aluminum building material having an anodic oxide film coated with a coating of a two-layer structure composed of an ordinary coating film and a coating film incorporating fine particles of a semiconductor and fine particles of an antibacterial metal therein.

FIG. 8 illustrates an example of the formation of a coating film of a two-layer structure formed on the anodic oxide film 2 and consisting of an ordinary coating film 12g constituting the under layer and a coating film 12h superposed on the coating film 12g and having the fine particles of the semiconductor 11 and the fine particles of the antibacterial metal 13 incorporated in a mixed state therein.

Figure 9:
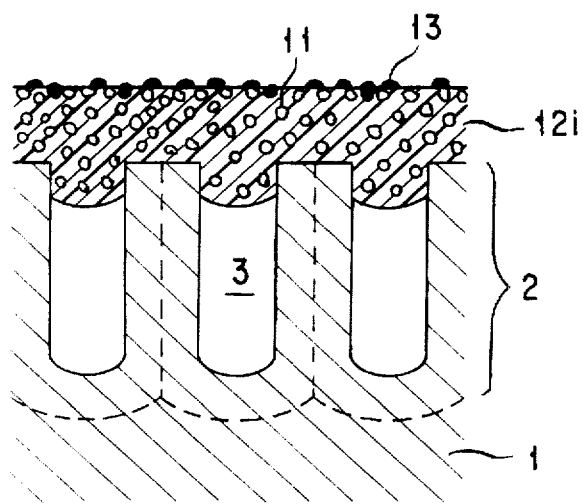
FIG. 9 is an enlarged fragmentary cross sectional view schematically showing the structure of an anodized aluminum building material having a coating film containing fine particles of a semiconductor therein and fine particles of an antibacterial metal deposited on the surface thereof.

FIG. 9 illustrates a structure in which a coating film 12i having the fine particles of the photocatalytically active semiconductor 11 incorporated therein is applied to the anodic oxide film 2 produced on the surface of the ground metal of aluminum alloy 1 and fine particles of an antibacterial metal 13 is deposited on the coating film 12i.

The mode of application of the photocatalytic film to the anodic oxide film is not limited to the examples cited above. The application may be fulfilled in various modes on the condition that the effect aimed at by the present invention be attained.

Yet another embodiment of the present invention resides in providing a fixture unit or fitting unit which comprises a frame member or rail-and-stile fabricated with aluminum building materials which excel in the antibacterial and antifungal properties as mentioned above and other member vested similarly with the antibacterial and antifungal properties such as, for example, a panel member coated on the surface thereof with a photocatalytic film or a watertight and airtight member or sealant having fine particles of a photocatalytically active semiconductor contained therein or deposited thereon. By assembling these building members and completing a fixture unit, the antibacterial and antifungal properties of the produced fixture unit can be further enhanced and not only the surfaces of the building members but also the entire space of a room formed of these building members can be purged and kept hygienically for a long time.

Specifically, when the entire surface of a fixture is coated with the photocatalytic film, the coated surface constantly manifests a photocatalytic function and, owing to the principle described above, exhibits an antibacterial and antifungal effects because it is irradiated in the daytime by the sunlight and even at night by the light from the fluorescent lamp. The indoor air constantly comes into contact with the surface of the fixture by virtue of convection and, therefore, becomes clean in consequence of the contact with the coated surface of the fixture.

The panel member mentioned above can use various materials. It is advantageous to use a panel member which is obtained by forming an anodic oxide film on the surface of a substrate made of aluminum alloy similarly to the aforementioned aluminum building material and applying a photocatalytic film to the anodic oxide film, a metal panel member which is obtained by further depositing such an antibacterial metal as Ag, Cu, or Pt on the aforementioned photocatalytic film, a resin panel member which is obtained by applying a photocatalytic film either alone or in combination with the aforementioned antibacterial metal as a coating to the surface of a substrate made of synthetic resin, a glass panel member which is obtained by applying a photocatalytic film either alone or in combination with the aforementioned antibacterial metal to the surface of a substrate made of glass, etc.

As a means for applying a semiconductor film capable of serving as a photocatalytic film particularly to the glass panel member to be used in a window, the sol-gel method, plating method, and such vapor deposition methods as sputtering process mentioned above can be used. The thickness of this film is properly in the range of several nm to 1 µm. Though the photocatalytic action is exalted and, as a consequence, the antibacterial and antifungal properties are improved in proportion as the film thickness is increased, an increase of the film thickness beyond 1 µm will be undesirable because the excess thickness goes to render the film easily separable from the surface of glass. Conversely, as the thickness of the film is decreased, so the photocatalytic action is reduced and the antibacterial and antifungal properties are precluded from being fully manifested. Thus, the desirable film thickness is not less than several nm, preferably not less than 10 nm.

Optionally, the surface of the glass panel member in the window which has been coated with the semiconductor film as described above may be further coated with an antibacterial metal such as copper, silver, or platinum in the same manner as the application of the semiconductor film mentioned above. As a result, the surface is enabled to maintain the antibacterial properties at night after the fluorescent lamp is turned off. Appropriately, the thickness of the film of the antibacterial metal is in the range of 1 to 10 nm. The film of the antibacterial metal gains in antibacterial effect in proportion as the thickness of the film increases. If the thickness of this film exceeds 10 nm, the permeability of the glass panel member to light will decrease possibly to the extent of depriving the window of its function. This excessive film thickness also results in degrading the antibacterial and antifungal effects of the underlying semiconductor film. The thickness of the film of the antibacterial metal is appropriately in the range of 1 to 10 nm. This antibacterial metal is not always required to be attached in the form of a film to the surface of the glass panel member in the window. In due respect of the permeability of the glass panel member to light, it is preferably attached as dispersed in the pattern of islands in a sea to the glass panel member.

The watertight and airtight material or sealant mentioned above is obtained by dispersing fine particles of a semiconductor in a base material made of such a macromolecular material as rubber or resin with a view to imparting the antibacterial and antifungal properties to the material. Particularly, the gasket member which is used as a fixing part for the glass panel member in the window is at a disadvantage in tending to collect dew condensate, dirt, etc., consequently suffer growth of mildew, ultimately tarnish, become unhygienic, and spoil appearance. This problem can be eliminated by using the watertight and airtight material of the present invention.

The incorporation of the fine particles of a semiconductor in a base material of a macromolecular substance can be fulfilled by various methods such as, for example, a method which comprises causing the fine particles of a photocatalytically active semiconductor to be incorporated in the base material in such a manner that they will be distributed with a gradient tending toward at least one surface thereof or a method which comprises forming a two-layer structure consisting of a layer formed of a macromolecular material incorporating therein fine particles of a photocatalytically active semiconductor and a layer formed of a macromolecular material not incorporating therein the fine particles mentioned above. By causing the fine particles of the semiconductor to exist in an ample amount in the surface layer part of the material and avoid existing in the inner part thereof to the fullest possible extent as described above, the amount of the fine particles of the semiconductor to be incorporated can be decreased and the problem of the material being compelled to sacrifice, if partly, such mechanical properties as elongation and strength in consequence of the incorporation of the fine particles of the semiconductor in a large amount can be solved. Further, the material is allowed to manifest an excellent microbacterial and antifungal effects because the fine particles of the semiconductor are present in an ample amount in the surface layer part of the material which is destined to be exposed to light.

The proportion of the amount of the fine particles of the semiconductor to be incorporated in the macromolecular base material appropriately is in the range of 0.01 to 1000% by weight, based on the weight of the base material. If this proportion is smaller than 0.01% by weight, the amount of the fine particles of the semiconductor expected to manifest photocatalytic properties will be insufficient and, as a consequence, the watertight and airtight material will acquire the antibacterial and antifungal effects only insufficiently. Conversely, if this ratio exceeds 1000% by weight, the watertight and airtight material will suffer the mechanical properties thereof to decline conspicuously, though it will manifest the antibacterial and antifungal properties infallibly.

The diameter of the fine particles of semiconductor to be used is appropriately in the range of 1 nm to 100 μm, preferably in the range of 5 nm to 10 μm. If the particle diameter is smaller than 1 nm, the problem ensues that the band gap will be enlarged by the quantum size effect and the photocatalytic properties will not be obtained unless in the presence of light of a short wavelength emitted from a low-pressure mercury vapor lamp or the like. If the particle diameter is unduly small, the problem arises that the fine particles of semiconductor will allow no easy handling and they will manifest inferior dispersibility in a resin. From the viewpoint of the ease of handling, the particle diameter is appropriately not less than 5 nm. Conversely, if the particle diameter exceeds 100 μm, the surface of the material will suffer ultimate presence of relatively large particles of semiconductor and consequently manifest inferior smoothness and the particles exposed through the surface will tend to fall off. In view of the smoothness of the surface of the material etc., the particle diameter of semiconductor is appropriately not more than 10 μm.

The macromolecular material which is effectively usable for the base material of the watertight and airtight material is subject to no particular restriction except for the requirement that it be possessed of appropriate flexibility and strength and further that it be stable to the photocatalytic action. As concrete examples of the macromolecular material answering this description, vinyl chloride resin, acrylic rubber, nitrile rubber (NBR), butyl rubber (IIR), styrene-butadiene rubber (SBR), and ethylene-propylene terpolymer (EPDM) may be cited. This material may be properly selected to suit the kind of use contemplated. When the watertight and airtight material of the present invention is used as a gasket member, various kinds of resin or rubber which have been heretofore used for gaskets can be advantageously used as the macromolecular material mentioned above.

The watertight and airtight material of the present invention may contain, as a material for further improving the antibacterial properties thereof, fine particles of such an antibacterial metal as copper, silver, or platinum besides the fine particles of the semiconductor mentioned above. Since these metals manifest the antibacterial effect even in the absence of the irradiation of light, the building grade watertight and airtight material containing the antibacterial metal in the surface layer thereof is enabled to maintain the antibacterial and antifungal properties at night even after the fluorescent lamp is turned off. Incidentally, the size and the shape of the antibacterial metal and the method of addition thereof to the macromolecular material are the same as those of the fine particles of the photocatalytically active semiconductor mentioned previously. The content of the metal is appropriately such that the total of this content and the content of the fine particles of the semiconductor which are contained simultaneously therewith may fall in the range of 0.01 to 1000% by weight based on the amount of the macromolecular material.

Now, the present invention will be described specifically below with reference to working examples and a comparative example.

EXAMPLE 1

To an Al plate having an anodic oxide film formed thereon in a thickness of 10 μm in an electrolytic bath containing sulfuric acid, $TiO_2$ as a photocatalyst was applied in an amount such as to form a film 0.1 μm in thickness. The coating was effected with an RF magnetron sputtering device under the following conditions.

Target: Ti

Sputtering gas: Ar+$O_2$

Gas pressure (total): 0.5 Pa ($O_2$ partial pressure: $5 \times 10^{-3}$ Pa)

Sputtering time: 30 minutes

EXAMPLE 2

To an Al plate having an anodic oxide film formed thereon in a thickness of 15 μm in an electrolytic bath containing sulfuric acid, $TiO_2$ as a photocatalyst was applied in an amount such as to form a film 0.1 μm in thickness. The coating was effected with the same RF magnetron sputtering device as used in Example 1. The coating conditions were identical with those of Example 1, excepting that the sputtering time was set at 20 minutes.

Comparative Example

To an Al plate having no anodic oxide film formed thereon, $TiO_2$ as a photocatalyst was applied in an amount such as to form a film 0.1 μm in thickness. The coating was effected with the same RF magnetron sputtering device as used in Example 1. The coating conditions were identical with those of Example 1.

Evaluation of antifungal properties

Figure 10:
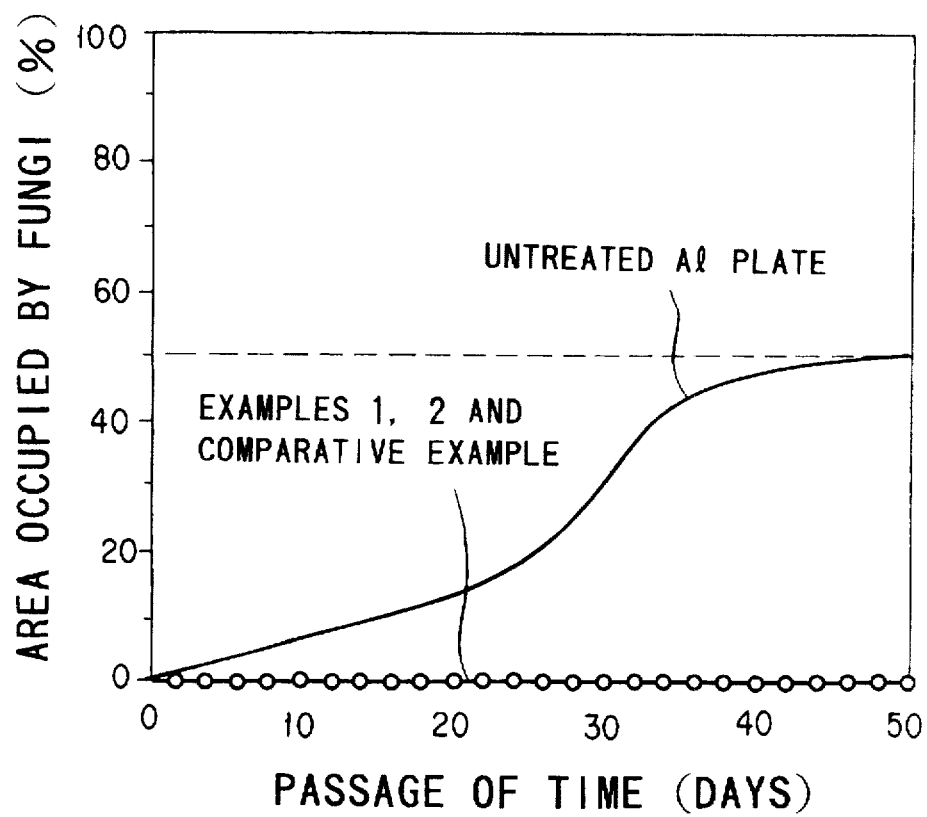
FIG. 10 is a graph showing changes with time of areas occupied by fungi on aluminum plates coated with a $TiO_2$ film obtained in Examples 1 and 2 and Comparative Example.

The Al plates obtained in Examples 1 and 2 and Comparative Example as coated with a $TiO_2$ film and the untreated Al plate were left standing for 50 days in the ambient air kept under the conditions of 25° C. of temperature and 90% of humidity to test for antifungal effect. The changes with time of areas occupied by fungi on the $TiO_2$ coating surface are shown in FIG. 10.

Evaluation of adhesive properties

The Al plates obtained in Examples 1 and 2 and Comparative Example as coated with a $TiO_2$ film were tested for adhesiveness of coating film by the use of a cellophane adhesive tape as defined in Paragraph 5.8 of JIS (Japanese Industrial Standard) H 8602 (Scotch tape test) and subjected to a scratch test in accordance with the method defined in JIS H 8504 to determine the adhesiveness of the relevant $TiO_2$ films to the substrate. The Scotch tape test defined in Paragraph 5.8 of JIS H 8602 is performed by a procedure which comprises incising 11 linear cuts each in two perpendicular directions through the coating film of a sample as spaced 1 mm apart with a sharp knife thereby producing 100 cross-cut squares, attaching an adhesive tape 12 mm in width fast to the cross-cut squares with a finger tip, immediately pulling the adhesive tape directly upward, and visually examining the coating film to find the presence or absence of separation of any of the cross-cut squares. The scratch test defined in JIS H 8504 is performed by a procedure which comprises pressing a diamond penetrator having an apical angle of 120° and a tip radius of 0.2 mm perpendicularly against the surface of a coating film of a sample and moving the penetrator to scratch the surface of the coating film. The results are shown in Table 1.

TABLE 1

| Example No. | Scotch tape test | Scratch test |
| --- | --- | --- |
| Example 1 | No separation | No separation |
| 2 | No separation | No separation |
| Comparative Example | Presence of separation | Presence of separation |

It is noted from FIG. 10 that all the Al plates coated with a $TiO_2$ film invariably manifested an antifungal effect and this antifungal effect was not affected by the presence or absence of an anodic oxide film formed on the Al plate coated with the $TiO_2$ film. It is clearly noted from the results of the test for adhesiveness shown in Table 1, however, that when the $TiO_2$ film was directly formed on the Al plate having no anodic oxide film formed thereon, the adhesive strength of the $TiO_2$ film was so low that this film was separated in the test for adhesiveness. In contrast, when the $TiO_2$ film was applied to the anodic oxide film formed on the Al plate as in the case of Example 1 and Example 2, the $TiO_2$ film showed improved adhesive strength and incurred absolutely no separation of cross-cut squares.

EXAMPLE 3

To Al plates having an anodic oxide film formed thereon in a thickness of 10 μm in an electrolytic bath containing sulfuric acid, an acrylic coating material having a finely divided powder (average particle diameter: 20 nm) of $TiO_2$, a photocatalyst, incorporated in a mixed state therein in a proportion of 5% by weight (Sample No. 1), 50% by weight (Sample No. 2), or 100% by weight (Sample No. 3), was applied in an amount such as to form a film 10 μm in thickness by the electrodeposition coating process.

For comparison, to an Al plate having no anodic oxide film formed thereon, an acrylic coating material having a finely divided powder (average particle diameter: 20 nm) of $TiO_2$ a photocatalyst, incorporated therein in a proportion of 50% by weight was applied in an amount such as to form a film 10 μm in thickness by the electrodeposition coating process (Sample No. 4).

The electrodeposition coating was performed by a procedure which comprised mixing the fine powder of $TiO_2$ and the coating material at a prescribed ratio, diluting the resultant mixture with water, immersing the anodized Al plate in the produced coating material, allowing the coating material and the Al plate to remain in intimate contact for one minute in the absence of flow of electric current, and continuing exertion of a voltage, DC 200 V, on the Al plate enveloped with the coating material until a film grew to a necessary thickness. The coated Al plate was washed twice with purified water and then baked at 190° C. for 40 minutes.

Evaluation of antifungal effect

The Al plates obtained in Example 3 as coated with a film of a coating material containing fine particles of $TiO_2$ were left standing for 50 days in the ambient air kept under the conditions of 25° C. of temperature and 90% of humidity to test for antifungal effect. The results are shown in Table 2. The rating was made on the two-point scale, wherein ○ stands for absence and x for presence respectively of discernible growth of fungi on the surface of a coat.

TABLE 2

| Sample No. | Antifungal effect |
| --- | --- |
| 1 | x |
| 2 | ○ |
| 3 | ○ |
| 4 | ○ |

Evaluation of adhesive properties

The Al plates obtained in Example 3 as coated with a coating material containing fine particles of $TiO_2$ were subjected to the aforementioned Scotch tape test (the test for adhesiveness of coating film by the use of a cellophane adhesive tape as defined in Paragraph 5.8 of JIS H 8602) and subjected to the aforementioned scratch test in accordance with the method defined in JIS H 8504 to determine the adhesiveness of the relevant coating films to the substrate. The results of these tests are shown in Table 3.

TABLE 3

| Sample No. | Scotch tape test | Scratch test |
| --- | --- | --- |
| 1 | Absence of separation | Absence of separation |
| 2 | Absence of separation | Absence of separation |
| 3 | Presence of separation | Presence of separation |
| 4 | Presence of separation | Presence of separation |

It is noted from Table 2 that Sample No. 1 showed no sufficient antifungal effect and Sample Nos. 2 through 4 showed a discernible antifungal effect. The insufficient antifungal property of Sample No. 1 may be logically explained by a supposition that the amount of the photocatalyst, $TiO_2$, exposed through the surface of the coating film was small because the amount of the photocatalyst incorporated in the coating material was small. The other samples discernibly manifested the antifungal effect because the amounts of the photocatalyst incorporated in the coating material were ample.

It is clearly noted from the results of the test for adhesive properties given in Table 3 that Sample No. 3 and Sample No. 4 were deficient in the adhesive properties. Sample No. 3 was possessed of poor adhesive properties because the amount of $TiO_2$, the photocatalyst, incorporated in the coating material was unduly large. Sample No. 4 which had a coating film applied to the Al plate having no anodic oxide film formed thereon was deficient in adhesiveness because of the absence of the anchoring effect belonging to an anodic oxide film. Samples No. 1 and No. 2 which applied coating films incorporating 5% by weight and 50% by weight respectively of a photocatalyst therein to an anodic oxide film showed improved adhesive strength of coating film and incurred absolutely no separation of the coating film in the test for adhesive properties.

EXAMPLE 4

To an Al plate having an anodic oxide film formed thereon in a thickness of 10 μm in an electrolytic bath containing sulfuric acid, an acrylic coating material in its simple form was applied in an amount such as to produce a film 8 μm in thickness by the electrodeposition coating process and then an acrylic coating material having a finely divided powder (average particle diameter: 20 nm) of $TiO_2$ incorporated in a mixed state therein in a proportion of 50% by weight was applied in an amount such as to form a film 2 μm in thickness by the electrodeposition coating process. The conditions of the electrodeposition coating and the procedure therefor were the same as those of Example 3.

The antibacterial and antifungal coating film obtained in Example 4 was rated with respect to antifungal effect and adhesive properties in the same manner as described above. The results are shown in Table 4.

TABLE 4

| Antifungal effect | Scotch tape test | Scratch test |
| --- | --- | --- |
| ○ | Absence of separation | Absence of separation |

It is clearly noted from the results given in Table 4 that the Al plate which was provided with a coating film of a two-layer structure excelled in both antifungal effect and adhesiveness and incurred no discernible separation between the coating film incorporating the photocatalyst therein and the ordinary coating film.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. An aluminum building material comprising a substrate made of aluminum or an aluminum alloy, an anodic oxide film having micropores formed on a surface of said substrate, and a film containing a photocatalytically active semiconductor and deposited on said anodic oxide film.

2. The material according to claim 1, wherein said anodic oxide film has a thickness in the range of 0.001 to 30 μm and a pore diameter in the range of 5 to 250 nm.

3. The material according to claim 1, wherein said film containing said photocatalytically active semiconductor is made of a film of said semiconductor possessed of a photocatalytic effect.

4. The material according to claim 3, wherein said semiconductor film has a thickness of not more than 1 μm.

5. The material according to claim 1, wherein said photocatalytically active semiconductor is $TiO_2$.

6. The material according to claim 1, wherein said film containing said photocatalytically active semiconductor further contains an antibacterial metal.

7. The material according to claim 6, wherein said antibacterial metal is deposited on said semiconductor film.

8. The material according to claim 6, wherein said antibacterial metal is at least one metal selected from the group consisting of copper, silver, and platinum.

9. An aluminum building material comprising a substrate made of aluminum or an aluminum alloy, an anodic oxide film having micropores formed on a surface of said substrate, and a coating film applied to said anodic oxide film and having particles of a photocatalytically active semiconductor contained therein or deposited thereon.

10. The material according to claim 9, wherein said photocatalytically active semiconductor is $TiO_2$.

11. The material according to claim 9, wherein a base material for said coating film is a coating material containing at least one resin selected from the group consisting of an acrylic resin, a polyester resin, a polyurethane resin, and a fluorocarbon resin.

12. The material according to claim 11, wherein the amount of said semiconductor contained in said coating film is in the range of 0.01 to 100% by weight, based on the weight of said coating material.

13. The material according to claim 9, wherein said particles of semiconductor have a diameter in the range of 1 nm to 1 μm.

14. The material according to claim 9, wherein said coating film has a thickness of not more than 50 μm.

15. The material according to claim 9, wherein at least part of said particles of the semiconductor are partially exposed through the surface of said coating film.

16. The material according to claim 9, wherein said coating film further contains particles of an antibacterial metal incorporated therein or deposited thereon.

17. The material according to claim 16, wherein said antibacterial metal is at least one metal selected from the group consisting of copper, silver, and platinum.

18. The material according to claim 16, wherein said particles of the antibacterial metal have a diameter in the range of 1 nm to 1 μm.

19. The material according to claim 16, wherein the total amount of said semiconductor and said antibacterial metal is in the range of 0.01 to 100% by weight, based on the weight of a coating material for said coating film.

20. The material according to claim 16, wherein at least part of said particles of the antibacterial metal are partially exposed through the surface of said coating film.

21. The material according to claim 16, wherein said coating film is made of a coating film having particles of said photocatalytically active semiconductor and particles of said antibacterial metal incorporated in a mixed state therein.

22. The material according to claim 9, wherein said coating film has a two-layer structure composed of an under coating layer incorporating no particles of semiconductor and a surface coating layer superposed on said under coating layer and incorporating particles of said photocatalytically active semiconductor therein.

23. The material according to claim 22, wherein said under coating layer has a thickness in the range of not more than 50 μm and said surface coating layer has a thickness in the range of 0.5 to 1 μm.

24. The material according to claim 16, wherein said coating film has a two-layer structure composed of an under coating layer incorporating no particles of semiconductor and a surface coating layer superposed on said under coating layer and incorporating particles of said photocatalytically active semiconductor and particles of said antibacterial metal in a mixed state therein.

25. The material according to claim 24, wherein said under coating layer has a thickness in the range of not more than 50 μm and said surface coating layer has a thickness in the range of 0.5 to 1 μm.

26. A fixture unit comprising in combination:
(a) a frame member made of an aluminum building material comprising a substrate made of aluminum or an aluminum alloy, an anodic oxide film having micropores formed on a surface of said substrate, and a film containing a photocatalytically active semiconductor and deposited on said anodic oxide film, (b) a panel member having a surface thereof coated with a film containing a photocatalytically active semiconductor, and
(c) a watertight and airtight member containing particles of a photocatalytically active semiconductor.

27. The unit according to claim 26, wherein said panel member is a glass panel member for a window.

28. The unit according to claim 26, wherein said photocatalytically active semiconductor is $TiO_2$.

29. The unit according to claim 26, wherein said film containing said photocatalytically active semiconductor further contains an antibacterial metal.

* * * * *